United States Patent [19]

Mohr et al.

[11] Patent Number: 5,958,810
[45] Date of Patent: Sep. 28, 1999

[54] OPTICAL GLASS WITH VARYING REFRACTION INDEX

[75] Inventors: Werner Mohr, Zwiesel, Germany; Boris Goldenfang, St. Petersburg, Russian Federation; Vladimir Il'Lin, St. Petersburg, Russian Federation; Vladislav Lifschitz, St. Petersburg, Russian Federation; Nikolai Remizov, St. Petersburg, Russian Federation

[73] Assignee: Optische Werke G. Rodenstock, Munich, Germany

[21] Appl. No.: 08/875,137

[22] PCT Filed: Jan. 18, 1996

[86] PCT No.: PCT/DE96/00068

§ 371 Date: Oct. 28, 1997

§ 102(e) Date: Oct. 28, 1997

[87] PCT Pub. No.: WO96/22254

PCT Pub. Date: Jul. 25, 1996

[30] Foreign Application Priority Data

Jan. 18, 1995 [DE] Germany .......................... 195 01 262

[51] Int. Cl.$^6$ .......................... C03C 3/064; C03C 3/072; C03C 3/085; C03C 3/091
[52] U.S. Cl. .................. 501/56; 501/66; 501/69; 501/72; 501/75; 501/77; 501/900; 65/30.13
[58] Field of Search ................................. 501/56, 66, 68, 501/69, 72, 75, 77, 900; 65/30.13

[56] References Cited

U.S. PATENT DOCUMENTS

| | | |
|---|---|---|
| 3,873,408 | 3/1975 | Hensler . |
| 4,038,090 | 7/1977 | Gliemeroth . |
| 4,076,544 | 2/1978 | Kerko et al. . |
| 4,405,672 | 9/1983 | Araujo et al. .............................. 501/13 |
| 4,576,104 | 3/1986 | Wu ............................................. 501/55 |
| 4,756,733 | 7/1988 | Houde-Walter et al. ............... 65/30.13 |
| 4,812,423 | 3/1989 | Kodama et al. .......................... 501/55 |
| 5,007,948 | 4/1991 | Araujo ....................................... 501/13 |
| 5,145,757 | 9/1992 | Smoot et al. . |
| 5,674,790 | 10/1997 | Araujo ....................................... 501/52 |

FOREIGN PATENT DOCUMENTS

| | | |
|---|---|---|
| 269 615 | 7/1989 | Denmark . |
| 1 172 503 | 11/1965 | European Pat. Off. . |
| 0 287 345 | 10/1988 | European Pat. Off. . |
| 35 7 022 139 | 2/1982 | Japan . |

OTHER PUBLICATIONS

French, William G., et al., Refractive Index Changes Produced in Glass by Ion Exchange, Ceramic Bulletin, vol. 49, No. 11 (1970), pp. 974–977. No Month .

Livshits, V. Ya., Elastic and Optical Properties of Alkali Titanium Tin Silicate . . . , Glass Physics and Chemistry, Jul./Aug. 1994, vol. 20, No. 4, New York. pp. 340–344.

Maksimov, V.M., Aplanatic Radial Gradient–Index Lenses Produced . . . , Glass Physics and Chemistry, Jan./Feb., vol. 20, No. 1, New York, pp. 52–58.

Fujii, Kiyosumi, Selective Adsorption of Lithium Ions From Molten Salt . . . , Journal of the Ceramic Society of Japan, 102 (1994) Oct., No. 10, Tokyo, Japan, pp. 900–904.

Houde–Walter, Susan N., et al., Delta–n Control in Grin Glass by . . . , Applied Optics, 25(1986) Oct. 1, No. 19, New York, pp. 3373–3378.

*Primary Examiner*—Mark L. Bell
*Assistant Examiner*—David Sample
*Attorney, Agent, or Firm*—Evenson, McKeown, Edwards & Lenahan, P.L.L.C.

[57] ABSTRACT

Optical glasses or lenses are described having a refractive index that varies as a function of at least one coordinate, which is made from a starting material with a constant refractive index by ion exchange. Greater index gradients than with the prior art are achieved by special compositions and ion exchange baths intended therefor. In addition, the stability of the glasses is increased.

13 Claims, No Drawings

OPTICAL GLASS WITH VARYING REFRACTION INDEX

TECHNICAL AREA

The invention relates to an optical glass or lens with a refractive index that varies as a function of at least one coordinate and is produced from a starting material with a constant refractive index by ion exchange.

PRIOR ART

Optical glasses with varying refractive indexes according to the preamble of the secondary claims have bene known for a long time. In the known optical glasses, the variation in refractive index is too narrow for many applications such as spectacle lenses. Moreover, known materials produced by ion exchange have comparatively low stability in aggressive media such as "sea air." This means that aggressive media can cause the lens to cloud and/or lead to an undesired variation in refractive index.

EXPLANATION OF INVENTION

A goal of the invention is to further the development of optical glasses in such a manner that, for ophthalmologic applications for example, they have sufficient stability with a variation in refractive index of at least 0.07.

One method of achieving this goal according to the invention is provided in the secondary claims. Further embodiments of the invention are subjects of the dependent claims.

According to one aspect of the present invention the optical glass is produced from a starting material containing the following substances

| | |
|---|---|
| $SiO_2$ | 56 wt. % ± 5 wt. % |
| $Na_2O$ | 23.5 wt. % ± 2 wt. % |
| $TiO_2$ | 17 wt. % ± 2 wt. % |
| $SnO_2$ | 4.5 wt. % ± 2.5 wt. % |
| $Sb_2O_3$ | 0.01 ... 0.7 wt. % |
| NaCl | 0.05 ... 1 wt. % | and ion exchange takes place in a lithium melt.

According to another aspect of the invention alternative material is provided.

With this material, the starting material contains the following substances:

| | |
|---|---|
| $SiO_2$ | 45 wt. % ± 2.5 wt. % |
| $Al_2O_3$ | 30 wt. % ± 3 wt. % |
| $Na_2O$ | 16.5 wt. % ± 1.5 wt. % |
| $B_2O_3$ | 7.5 wt. % ± 1.5 wt. % |
| $Li_2O$ | 1.0 wt. % ± 0.2 wt. % |

With a starting material of this type, the ion exchange takes place in a silver melt.

According to another aspect of the invention third starting material is disclosed. With this material, the starting material consists of the following substances:

| | |
|---|---|
| $SiO_2$ | 40 wt. % ± 5 wt. % |
| $Al_2O_3$ | 30 wt. % ± 5 wt. % |
| $Na_2O$ | 14.5 wt. % ± 5 wt. % |
| $B_2O_3$ | 12 wt. % ± 2.5 wt. % |
| $Li_2O$ | 3 wt. % ± 1.5 wt. % |

With this material as well, ion exchange takes place in a silver melt.

Another starting material contemplated by the present invention includes the following composition:

| | |
|---|---|
| $SiO_2$ | 39 wt. % ± 5 wt. % |
| $Al_2O_3$ | 30 wt. % ± 5 wt. % |
| $Na_2O$ | 15 wt. % ± 2 wt. % |
| $B_2O_3$ | 12 wt. % ± 2.5 wt. % |
| $Li_2O$ | 2 wt. % ± 0.8 wt. % |
| BaO | 2 wt. % ± 0.8 wt. % | in which ion exchange also takes place in a silver melt.

An additional alternative for the optical glass is given by the starting material containing the following substances:

| | |
|---|---|
| $SiO_2$ | 37 wt. % ± 3 wt. % |
| $Al_2O_3$ | 28.5 wt. % ± 3 wt. % |
| $Na_2O$ | 15 wt. % ± 2 wt. % |
| $B_2O_3$ | 11.5 wt. % ± 2 wt. % |
| $Li_2O$ | 2 wt. % ± 0.5 wt. % |
| PbO | 6 wt. % ± 1.5 wt. % |

With this material as well, the ion exchange takes place in a silver melt.

Although percentages and specific tolerance ranges are listed above, it is understood that changes can be made.

Further embodiments are the subject of other claims, including the following:

With the materials according to the invention, not only can the variation in the refractive index amount to approximately 0.1, but the refractive index can also can vary over a range of approximately 10 mm from the peripheries.

The present invention is further directed to methods for producing the optical glasses according to the invention are given:

one aspect of the invention is a method for varying the refractive index, in which ion exchange of the starting material takes place in a salt melt, is characterized in that, with a starting material containing $SiO_2$, 56 wt. % (±5 wt. %); $Na_2O$, 23.5 wt. % (±2 wt. %), $TiO_2$, 17 wt. % (±2 wt. %); $SnO_2$, 4.5 wt. % (±2.5 wt. % 0); $Sb_2O_3$, 0.01 to 0.7 wt. %); and NaCl 0.05 to 1 wt. % the lithium melt consists of $Li_2MoO_4$, or $LiCrO_4$, and $Li_2SO_4$.

Here, the molar ratio between $Li_2MoO_4$, or $Li_2CrO_4$ and $Li_2SO_4$ can be approximately 1:2.

In another method of varying the refractive index according to the invention ion exchange of the starting material takes place in a salt melt, with other starting material according to the present invention the silver melt consists of AgCl and $Ag_2SO_4$ and $ZnSO_4$.

Here, the molar ratio between AgCl and $Ag_2SO_4$ and $ZnSO_4$ can amount to 55±3:23±1.2:22±1.1.

The use of the $Al_2O_3$ crucible is also contemplated in which the ion exchange takes place has the advantage that the glass is not contaminated with crucible material.

The invention has been described above with the aid of special examples which do not limit the general idea of the invention that can be derived from these examples. Greater index gradients than with the prior art are achieved by the compositions according to the invention and ion exchange baths intended for them.

In addition, the stability of the glasses is increased.

We claim:

1. Optical glass with a refractive index that varies as a function of at least one coordinate, made from a starting material with a constant refractive index by ion exchange, characterized in that the starting material contains the following substances:

| | |
|---|---|
| SiO$_2$ | 56 wt. % ± 5 wt % |
| Na$_2$O | 23.5 wt. % ± 2 wt. % |
| TiO$_2$ | 17 wt. % ± 2 wt. % |
| SnO$_2$ | 4.5 wt. % ± 2.5 wt. % |
| Sb$_2$O$_3$ | 0.01 to 0.7 wt. % |
| NaCl | 0.05 to 1 wt. % | and in that the ion exchange takes place in a lithium melt.

2. Optical glass with a refractive index that varies as a function of at least one coordinate, made from a starting material with a constant refractive index by ion exchange, characterized in that the starting material contains the following substances:

| | |
|---|---|
| SiO$_2$ | 40 wt. % ± 5 wt. % |
| Al$_2$O$_3$ | 30 wt. % ± 5 wt. % |
| Na$_2$O | 15 wt. % ± 2 wt. % |
| B$_2$O$_3$ | 12.0 wt. % ± 2.5 wt. % |
| Li$_2$O | 2.0 wt. % ± 0.8 wt. % |
| BaO | 2.0 wt. % ± 0.8 wt. % | and in that the ion exchange takes place in a silver melt.

3. Optical glass with a refractive index that varies as a function of at least one coordinate, made from a starting material with a constant refractive index by ion exchange, characterized in that the starting material contains the following substances:

| | |
|---|---|
| SiO$_2$ | 36 wt. % ± 3 wt. % |
| Al$_2$O$_3$ | 28 wt. % ± 3 wt. % |
| Na$_2$O | 15 wt. % ± 2 wt. % |
| B$_2$O$_3$ | 11 wt. % ± 2 wt. % |
| Li$_2$O | 2.0 wt. % ± 0.5 wt. % |
| PbO | 6.0 wt. % ± 1.5 wt. % | and in that the ion exchange takes place in a silver melt.

4. Glass according to one of claims 2 and 3, characterized in that the variation in the refractive index amounts to approximately 0.1.

5. Glass according to claim 4, characterized in that the refractive index varies over a range of approximately 10 mm from peripheries thereof.

6. Method for varying the refractive index in which ion exchange of the starting material takes place in a salt melt, characterized in that, with a starting material that contains the following substances:

| | |
|---|---|
| SiO$_2$ | 56 wt. % ± 5 wt. % |
| Na$_2$O | 23.5 wt. % ± 2 wt. % |
| TiO$_2$ | 17 wt. % ± 2 wt. % |
| SnO$_2$ | 4.5 wt. % ± 2.5 wt. % |
| Sb$_2$O$_3$ | 0.01 to 0.7 wt. % |
| NaCl | 0.05 to 1 wt. % | the ion exchange takes place in a lithium melt that consists of Li$_2$MoO$_4$, or LiCrO$_4$, and/or Li$_2$SO$_4$.

7. Method according to claim 6, characterized in that the molar ratio between Li$_2$MoO$_4$ or Li$_2$CrO$_4$, and Li$_2$SO$_4$ amounts to approximately 1:2.

8. Method for varying the refractive index in which ion exchange of the starting material takes place in a salt melt, characterized in that, with a starting material according to one of claims 2 and 3, the silver melt consists of AgCl and Ag$_2$SO$_4$ and ZnSO$_4$.

9. Method according to claim 8, characterized in that the molar ratio between AgCl and Ag$_2$SO$_4$ and ZnSO$_4$ amounts to 55±3:23±1.2:22±1.1.

10. Method according to claim 6, characterized in that the ion exchange takes place in an Al$_2$O$_3$ crucible.

11. Method according to 7, characterized in that the ion exchange takes place in an Al$_2$O$_3$ crucible.

12. Method according to 8, characterized in that the ion exchange takes place in an Al$_2$O$_3$ crucible.

13. Method according to 9 characterized in that the ion exchange takes place in an Al$_2$O$_3$ crucible.

* * * * *